(12) United States Patent
Lin

(10) Patent No.: US 6,454,461 B1
(45) Date of Patent: Sep. 24, 2002

(54) BEARING ASSEMBLY OF HUB OF BICYCLE

(76) Inventor: Chin-Kuo Lin, No. 1, Lane 331, Sec. 1 Tan Hsing Road, Tan Tsu Hsiang (TW)

( * ) Notice: Subject to any disclaimer, the term of this patent is extended or adjusted under 35 U.S.C. 154(b) by 0 days.

(21) Appl. No.: 09/819,424

(22) Filed: Mar. 29, 2001

(51) Int. Cl.[7] .............................................. F16C 13/00
(52) U.S. Cl. ............................ 384/545; 188/26; 192/64
(58) Field of Search ............................... 384/456, 543, 384/544, 545, 546; 188/26; 192/64

(56) References Cited

U.S. PATENT DOCUMENTS

| | | | | |
|---|---|---|---|---|
| 5,002,407 A | * | 3/1991 | Chi | 384/545 |
| 5,513,733 A | * | 5/1996 | Fu | 192/64 |
| 5,518,096 A | * | 5/1996 | Lin | 192/64 |
| 5,669,477 A | * | 9/1997 | Chen | 192/64 |
| 5,676,228 A | * | 10/1997 | Lin | 192/64 |

* cited by examiner

Primary Examiner—Christopher P. Schwartz
(74) Attorney, Agent, or Firm—Charles E. Baxley

(57) ABSTRACT

A bearing assembly of a hub of a bicycle includes a receiving ring formed with an tapered inclined face and a catch flange; a roller bearing mounted in the receiving ring and including a plurality of rollers arranged in a tapered manner; a cover ring including a rigid plate formed with a locking flange rested on the catch flange, and a rubber layer coated on the rigid plate; and a positioning bolt head including a lower tapered urging portion, and an upper positioning portion. The lower tapered urging portion is urged on the rollers of the roller bearing to push the rollers to press the inclined face, such that the receiving ring, the roller bearing, and the positioning bolt head are combined with each other in a press-fit manner without detachment.

6 Claims, 4 Drawing Sheets

BEARING ASSEMBLY OF HUB OF BICYCLE

BACKGROUND OF THE INVENTION

1. Field of the Invention

The present invention relates to a bearing assembly of a hub of a bicycle, and more particularly to a bearing assembly whose parts are combined rigidly without detachment during transportation.

2. Description of the Related Prior Art

In general, a bicycle includes a hub, a shaft extending through the hub, and two bearing sets each mounted between one of the two ends of the shaft and one of the two ends of the hub. Thus, the shaft is stationary, and the hub is rotated with the bicycle.

A conventional bearing set of a hub of a bicycle in accordance with the prior art shown in FIGS. 1 and 2 comprises a bowl 11, a ball bearing 12 received in the bowl 11 and having a plurality of balls 14, and a bolt head 13 mounted on the bowl 11 and having a periphery formed with a shelter ring 15 covering the bowl 11. Thus, the shaft is extended in the bearing set, and the inner wall of the bolt head 13 is formed with a thread engaged with the thread formed on each of the two ends of the shaft.

However, the bowl 11, the ball bearing 12, and the bolt head 13 of the conventional bearing set are not rigidly combined with each other, so that they are easily separated from each other during the process of movement and transportation, and so that they have to reassembled, thereby consuming the working time for assembling the parts of the bearing assembly. In addition, both of the shelter ring 15 and the bowl 11 are made of metallic material, so that the sealing effect between the shelter ring 15 and the bowl 11 is not very tight, thereby decreasing the waterproof and dustproof effects of the conventional bearing set.

SUMMARY OF THE INVENTION

The present invention has arisen to mitigate and/or obviate the disadvantage of the conventional bearing set of a hub of a bicycle.

In accordance with the present invention, there is provided a bearing assembly of a hub of a bicycle comprising:

a receiving ring having an inner wall formed with an inclined face arranged in a gradually tapered manner, a catch flange formed in the inner wall of the receiving ring;

a roller bearing mounted in the receiving ring and including an annular body arranged in a gradually tapered manner, and a plurality of rollers mounted in the annular body and arranged in a gradually tapered manner;

a cover ring secured in the receiving ring and including a rigid plate, and a rubber layer coated on an outer periphery of the rigid plate, the outer periphery of the rigid plate formed with a locking flange extended downward and rested on the catch flange of the receiving ring; and a hollow positioning bolt head mounted in the receiving ring and including a lower tapered urging portion, and an upper positioning portion, the lower tapered urging portion urged on the plurality of rollers of the roller bearing to push the plurality of rollers to press the inclined face of the receiving ring, such that the receiving ring, the roller bearing, and the positioning bolt head are combined with each other in a press-fit manner without detachment.

The upper positioning portion of the positioning bolt head defines at least one positioning recess. A locking member is attached to the upper positioning portion of the positioning bolt head and is formed with at least one locking lug secured in the at least one positioning recess. A hub is rotatably mounted on a shaft and has two ends each mounted with a locking member and a bearing assembly that includes the receiving ring, the roller bearing, the cover ring, and the positioning bolt head. The shaft has two ends each in turn extended through the bearing assembly and the locking member and each engaged with a nut.

The lower tapered urging portion of the positioning bolt head has a bottom face formed with a protruding block protruding outward from the bottom of the receiving ring. An annular groove is defined in the outer periphery of the protruding block. A snapping member is secured in the annular groove and is rested on the bottom of the receiving ring.

Further benefits and advantages of the present invention will become apparent after a careful reading of the detailed description with appropriate reference to the accompanying drawings.

DETAILED DESCRIPTION OF THE INVENTION

Figures 1, 2:
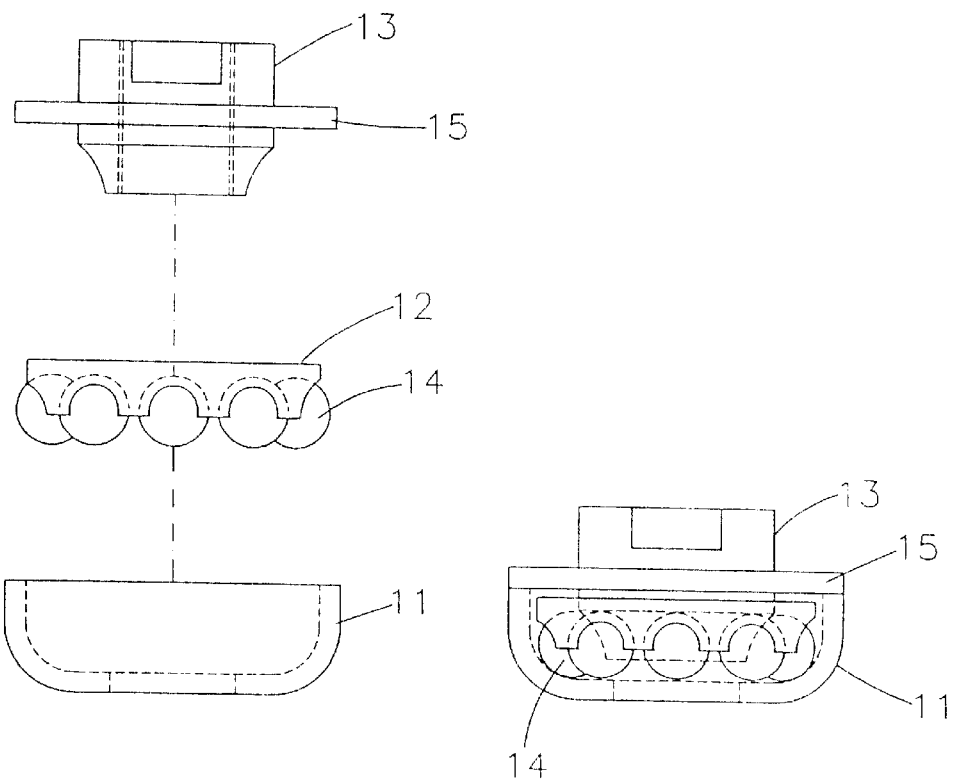
FIG. 1 is an exploded view of a conventional bearing set of a hub of a bicycle accordance with the prior art.
FIG. 2 an assembled view of the conventional bearing set of a hub of a bicycle as shown in FIG. 1.
Figure 3:
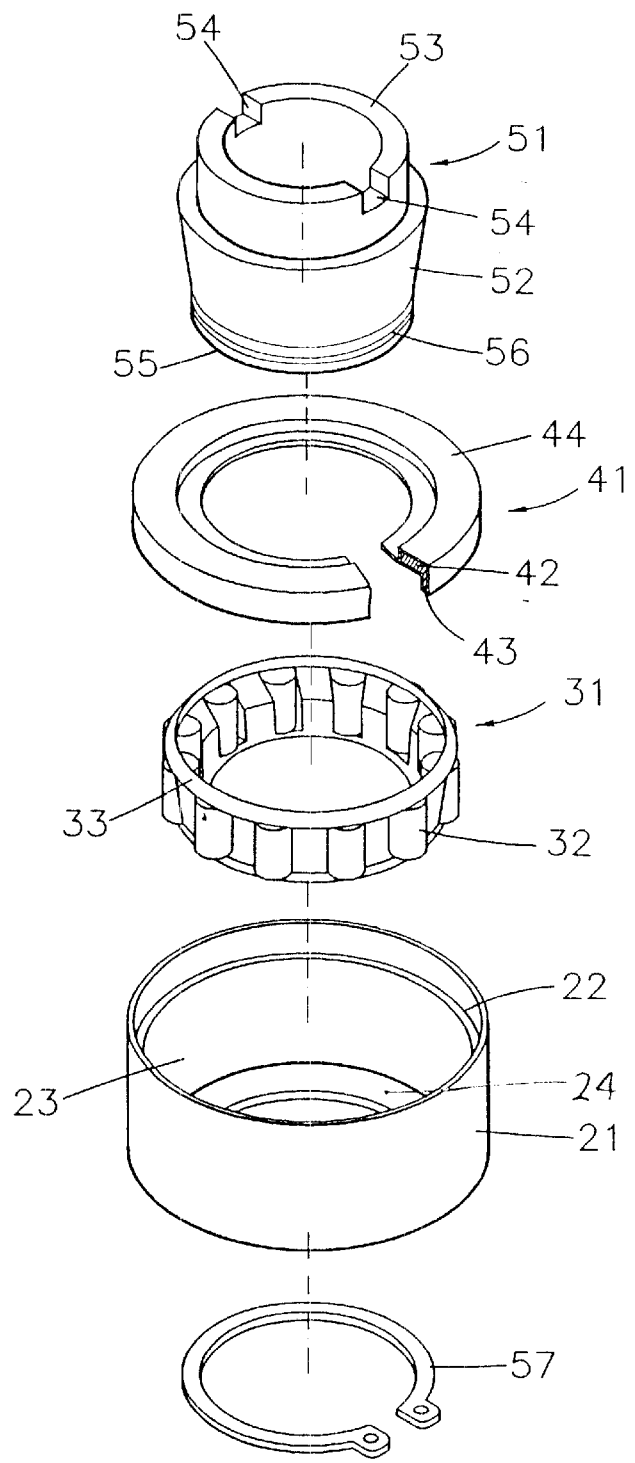
FIG. 3 is an exploded perspective view of a bearing assembly of a hub of a bicycle in accordance with the present invention.
Figure 4:
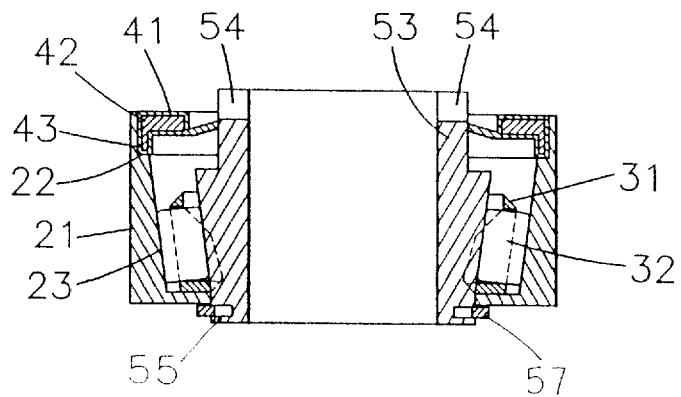
FIG. 4 is a front plan cross-sectional assembly view of the bearing assembly of a hub of a bicycle as shown in FIG. 3.

Referring to the drawings and initially to FIGS. 3 and 4, a bearing assembly of a hub of a bicycle in accordance with the present invention comprises a receiving ring 21, a roller bearing 31, a cover ring 41, and a hollow positioning bolt head 51.

The receiving ring 21 has an inner wall formed with an inclined face 23 arranged in a gradually tapered manner, that is, the inclined face 23 is contracted from top to bottom. A catch flange 22 is formed in the inner wall of the receiving ring 21. The bottom of the receiving ring 21 is formed with a bottom annular face 24 extended radially inward therefrom.

The roller bearing 31 is mounted in the receiving ring 21 and includes an annular body 33 arranged in a gradually tapered manner, that is, contracted from top to bottom, and a plurality of rollers 32 mounted in the annular body 33 and arranged in a gradually tapered manner, that is, contracted from top to bottom.

The cover ring 41 is secured in the receiving ring 21 and includes a rigid plate 42, and a rubber layer 44 coated on the outer periphery of the rigid plate 42. The outer periphery of the rigid plate 42 is formed with a locking flange 43 extended downward and rested on the catch flange 22 of the receiving ring 21.

The hollow positioning bolt head 51 is mounted in the receiving ring 21 and includes a lower tapered urging portion 52, and an upper positioning portion 53. The upper positioning portion 53 of the positioning bolt head 51 defines two positioning recesses 54. The lower tapered urging portion 52 is urged on the plurality of rollers 32 of the roller bearing 31 to push the plurality of rollers 32 to press the inclined face 23 of the receiving ring 21, such that the receiving ring 21, the roller bearing 31, and the positioning bolt head 51 are combined with each other in a press-fit manner without detachment.

The lower tapered urging portion 52 of the positioning bolt head 51 has a bottom face formed with a protruding block 55 protruding outward from the bottom of the receiving ring 21. An annular groove 56 is defined in the outer periphery of the protruding block 55. A snapping member 57, such as a C-shaped snap ring, is secured in the annular groove 56 of the protruding block 55 and is rested on the bottom of the receiving ring 21.

The outer diameter of the snapping member 57 is greater than the inner diameter of the bottom of the receiving ring 21, such that the snapping member 57 forms a locking and positioning action relative to the receiving ring 21.

By means of the bottom annular face 21 formed on the bottom of the receiving ring 21, the hollow inner diameter of the bottom of the receiving ring 21 is reduced, thereby reducing the diameter of the snapping member 57, so as to reduce the specification of the application product, thereby decreasing the cost of fabrication.

In assembly, still referring to FIGS. 3 and 4, the roller bearing 31 is placed in the receiving ring 21. The inclined outer wall of the roller bearing 31 may co-operate with the inclined face 23 of the receiving ring 21, such that the roller bearing 31 is positioned. The cover ring 41 is then placed in the receiving ring 21 by compressing the rubber layer 44, and the locking flange 43 is rested on the catch flange 22 of the receiving ring 21, such that the cover ring 41 is positioned and the roller bearing 31 cannot be detached upward.

The lower tapered urging portion 52 of the positioning bolt head 51 is then extended through the central hole of the cover ring 41, and is placed in the inner wall of the roller bearing 31. At the same time, the lower tapered urging portion 52 is urged on the rollers 32 of the roller bearing 31 to push the rollers 32 to tightly press the inclined face 23 of the receiving ring 21, such that the receiving ring 21, the roller bearing 31, and the positioning bolt head 51 are combined with each other in a press-fit manner without detachment.

Meanwhile, the protruding block 55 of the lower tapered urging portion 52 of the positioning bolt head 51 protrudes outward from the bottom annular face 24 of the receiving ring 21. The snapping member 57 is then snapped into the annular groove 56 of the protruding block 55 of the lower tapered urging portion 52 of the positioning bolt head 51.

The outer diameter of the snapping member 57 is greater than the inner diameter of the bottom of the receiving ring 21, such that the positioning bolt head 51 is positioned in the receiving ring 21 rigidly without detachment, thereby efficiently preventing the bearing assembly from separating due to an external force, and thereby facilitating installation of the bearing assembly.

Accordingly, the cover ring 41 is placed in the receiving ring 21, and the rubber layer 44 forms a tightly sealing effect with the wall of the receiving ring 21, so that the bearing assembly of the present invention possesses good waterproof and dustproof effects. In addition, the roller bearing 31 is opposite to the receiving ring 21 in an oblique manner, and the lower tapered urging portion 52 of the positioning bolt head 51 also has inclination. Thus, if a wearing clearance is produced between the roller bearing 31, the receiving ring 21, and the positioning bolt head 51, the fitting position of the roller bearing 31 and the positioning bolt head 51 can be adjusted, while the lower tapered urging portion 52 of the positioning bolt head 51 can push the rollers 32, thereby eliminating the wearing clearance easily, so as to facilitate maintenance of the bearing assembly. Further, the receiving ring 21, the roller bearing 31, the cover ring 41, and the positioning bolt head 51 of the bearing assembly are rigidly and stably combined with each other without detachment, such that the parts of the bearing assembly will not be separated from each other during the process of movement and transportation, without having to be reassembled, thereby greatly saving the working time for assembling the bearing assembly.

Figure 6:
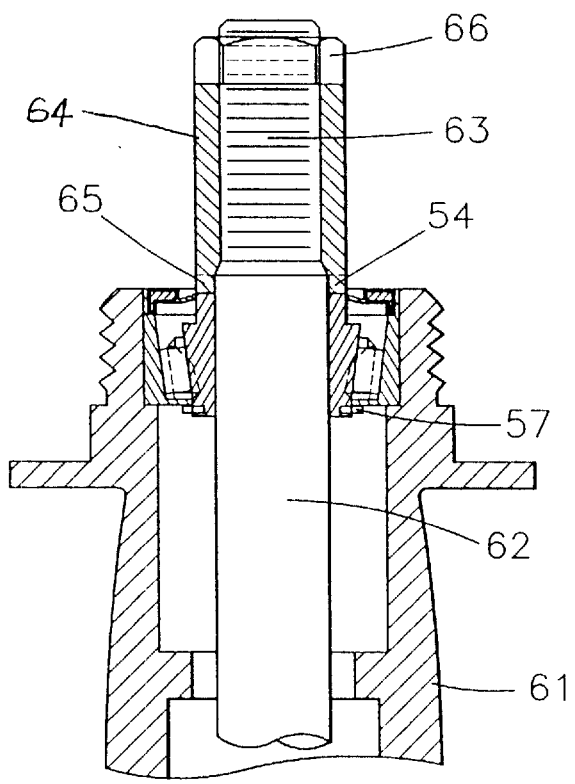
FIG. 6 is a front plan cross-sectional assembly view of the bearing assembly with a hub of a bicycle as shown in FIG. 5.
Figure 5:
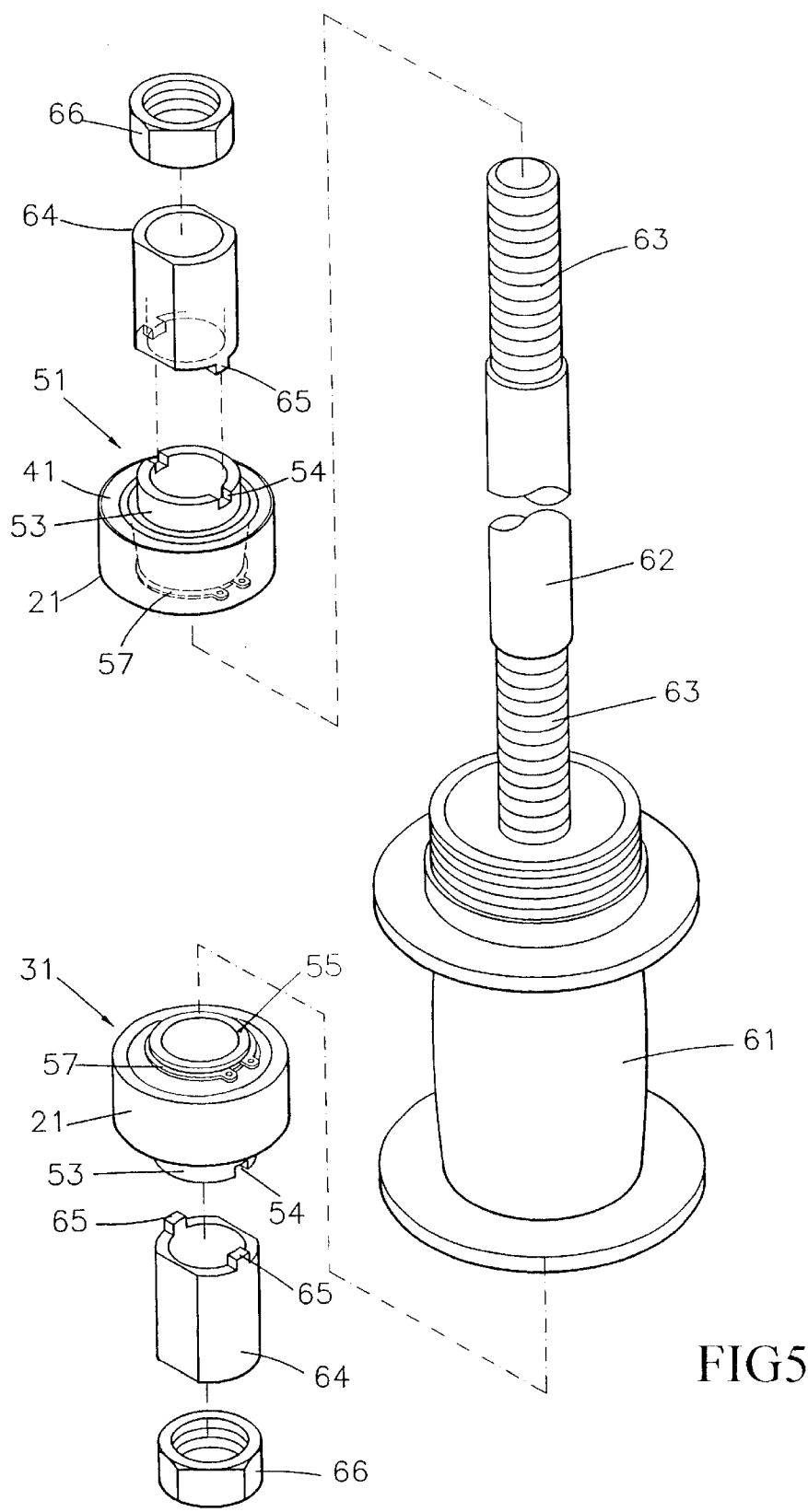
FIG. 5 an exploded perspective view of a bearing assembly that is combined with a hub of a bicycle in accordance with the present invention.

Referring to FIGS. 5 and 6 with reference to FIGS. 3 and 4, a hub 61 is rotatably mounted on a shaft 62, and two bearing assemblies of the present invention are each mounted between the hub 61 and the shaft 62. Each bearing assembly co-operates with a locking member 64 and a nut 66, and includes the receiving ring 21, the roller bearing 31, the cover ring 41, and the positioning bolt head 51. Each bearing assembly is secured on one of the two ends of the shaft 62, and is located in one of the two ends of the hub 61.

The locking member 64 is attached to the upper positioning portion 53 of the positioning bolt head 51 and is formed with two locking lugs 65 each secured in a respective positioning recess 54 of the upper positioning portion 53 of the positioning bolt head 51, such that the locking member 64 can be rotated with the positioning bolt head 51. Each of the two ends of the shaft 62 extends through the center of the positioning bolt head 51, and the locking member 64 is mounted on the shaft 62. Each of the two ends of the shaft 62 is formed with an outer thread 63 on which the nut 66 is screwed, thereby completing installation of the bearing assembly between the hub 61 the shaft 62.

Although the invention has been explained in relation to its preferred embodiment as mentioned above, it is to be understood that many other possible modifications and variations can be made without departing from the scope of the present invention. It is, therefore, contemplated that the appended claim or claims will cover such modifications and variations that fall within the true scope of the invention.

What is claimed is:

1. A bearing assembly of a hub of a bicycle comprising:
   a receiving ring (21) having an inner wall formed with an inclined face (23) arranged in a gradually tapered manner, a catch flange (22) formed in said inner wall of said receiving ring (21);
   a roller bearing (31) mounted in said receiving ring (21) and including an annular body (33) arranged in a gradually tapered manner, and a plurality of rollers (32) mounted in said annular body (33) and arranged in a gradually tapered manner;
   a cover ring (41) secured in said receiving ring (21) and including a rigid plate (42), and a rubber layer (44) coated on an outer periphery of said rigid plate (42), said outer periphery of said rigid plate (42) formed with a locking flange (43) extended downward and rested on said catch flange (22) of said receiving ring (21); and
   a hollow positioning bolt head (51) mounted in said receiving ring (21) and including a lower tapered urging portion (52), and an upper positioning portion (53), said lower tapered urging portion (52) urged on said plurality of rollers (32) of said roller bearing (31) to push said plurality of rollers (32) to press said inclined face (23) of said receiving ring (21), such that said receiving ring (21), said roller bearing (31), and said positioning bolt head (51) are combined with each other in a press-fit manner without detachment.

2. The bearing assembly of a hub of a bicycle in accordance with claim 1, wherein said upper positioning portion (53) of said positioning bolt head (51) defines at least one positioning recess (54), a locking member (64) is attached to said upper positioning portion (53) of said positioning bolt head (51) and is formed with at least one locking lug (65) secured in said at least one positioning recess (54), a hub (61) is rotatably mounted on a shaft (62) and has two ends each mounted with a locking member (64) and a bearing assembly that includes said receiving ring (21), said roller bearing (31), said cover ring (41), and said positioning bolt head (51), and said shaft (62) has two ends each in turn extended through said bearing assembly and said locking member (64) and each engaged with a nut (66).

3. The bearing assembly of a hub of a bicycle in accordance with claim 1, wherein said lower tapered urging portion (52) of said positioning bolt head (51) has a bottom face formed with a protruding block (55) protruding outward from a bottom of said receiving ring (21), an annular groove (56) is defined in an outer periphery of said protruding block (55), and said bearing assembly further comprises a snapping member (57) secured in said annular groove (56) and rested on said bottom of said receiving ring (21).

4. The bearing assembly of a hub of a bicycle in accordance with claim 3, wherein said snapping member (57) has an outer diameter greater than an inner diameter of said bottom of said receiving ring (21).

5. The bearing assembly of a hub of a bicycle in accordance with claim 3, wherein said snapping member (57) is a C-shaped snap ring.

6. The bearing assembly of a hub of a bicycle in accordance with claim 1, wherein said receiving ring (21) has a bottom formed with a bottom annular face (24) extended radially inward therefrom.

* * * * *